(12) United States Patent
He

(10) Patent No.: US 10,661,168 B2
(45) Date of Patent: May 26, 2020

(54) METHOD AND APPARATUS FOR PROCESSING INFORMATION, ELECTRONIC DEVICE AND STORAGE MEDIUM

(71) Applicant: NETEASE (HANGZHOU) NETWORK CO., LTD., Hangzhou (CN)

(72) Inventor: Zhaoda He, Hangzhou (CN)

(73) Assignee: NETEASE (HANGZHOU) NETWORK CO.,LTD., Hangzhou, Zhejiang (CN)

( * ) Notice: Subject to any disclaimer, the term of this patent is extended or adjusted under 35 U.S.C. 154(b) by 59 days.

(21) Appl. No.: 15/985,900

(22) Filed: May 22, 2018

(65) Prior Publication Data

US 2018/0339229 A1    Nov. 29, 2018

(30) Foreign Application Priority Data

May 26, 2017    (CN) .......................... 2017 1 0386455

(51) Int. Cl.
*A63F 13/2145* (2014.01)
*A63F 13/426* (2014.01)
(Continued)

(52) U.S. Cl.
CPC ........ *A63F 13/426* (2014.09); *A63F 13/2145* (2014.09); *A63F 13/822* (2014.09); *G06F 3/04847* (2013.01)

(58) Field of Classification Search
CPC .... A63F 13/04; A63F 13/214; A63F 13/2145; A63F 13/219; A63F 13/426;
(Continued)

(56) References Cited

U.S. PATENT DOCUMENTS

2006/0128468 A1* 6/2006 Yoshikawa ............. A63F 13/10
  463/36
2010/0069152 A1* 3/2010 Nishimura ............. A63F 13/10
  463/31
(Continued)

FOREIGN PATENT DOCUMENTS

CN    104111786 A    10/2014
CN    104965655 A    10/2015
(Continued)

OTHER PUBLICATIONS

1st Office Action dated Jan. 19, 2018 by the SIPO 2nd Office Action dated Apr. 2, 2018 by the SIPO.

*Primary Examiner* — Steven J Hylinski
(74) *Attorney, Agent, or Firm* — Yunling Ren

(57) ABSTRACT

The present disclosure provides a method for processing information, an apparatus for processing information, an electronic device, and a computer-readable storage medium. The method includes: in case that at least one of a touch sliding event passing a control and a touch sliding event starting from a control is detected, calculating a distance between a current position of a touch point of the touch sliding event and a position of the control in real time; and under the distance is greater than a first preset threshold, adjusting at least one of a direction and a distance of an emission operation for a corresponding skill of the control performed on a virtual character according to the current position of the touch point.

18 Claims, 9 Drawing Sheets

(51) Int. Cl.
*G06F 3/0484* (2013.01)
*A63F 13/822* (2014.01)

(58) Field of Classification Search
CPC .............. A63F 13/837; A63F 2300/204; A63F 2300/1068; A63F 2300/8076
See application file for complete search history.

(56) References Cited

U.S. PATENT DOCUMENTS

| | | | |
|---|---|---|---|
| 2011/0185309 A1* | 7/2011 | Challinor | G06F 3/011 715/784 |
| 2012/0184368 A1 | 7/2012 | Yamaoka | |
| 2012/0302338 A1* | 11/2012 | Shikata | A63F 13/06 463/31 |
| 2013/0288790 A1* | 10/2013 | Wang | A63F 13/06 463/31 |
| 2014/0066197 A1* | 3/2014 | Cousins | A63F 13/06 463/31 |
| 2014/0340329 A1* | 11/2014 | Chen | G06F 3/0416 345/173 |
| 2015/0094127 A1* | 4/2015 | Canose | A63F 13/42 463/2 |
| 2017/0220102 A1* | 8/2017 | Kim | G06F 9/44 |

FOREIGN PATENT DOCUMENTS

| | | | |
|---|---|---|---|
| CN | 105148517 A | | 12/2015 |
| CN | 105194871 A | * | 12/2015 |
| CN | 105194871 A | | 12/2015 |
| CN | 105194873 A | | 12/2015 |
| CN | 105446525 A | | 3/2016 |

* cited by examiner

METHOD AND APPARATUS FOR PROCESSING INFORMATION, ELECTRONIC DEVICE AND STORAGE MEDIUM

CROSS REFERENCE

This application is based upon and claims priority to Chinese Patent Application No. 201710386455.5, filed on May 26, 2017, the entire contents thereof are incorporated herein by reference.

TECHNICAL FIELD

The present disclosure relates to the field of human-computer interaction, and in particular, to a method for processing information, an apparatus for processing information, an electronic device, and a computer-readable storage medium.

BACKGROUND

With the rapid development of mobile communication technologies, a large number of game applications have appeared on touch terminals. When a skill is emitted in the game, the user may use the finger to operate on the touch screen to realize the diversification of skill emission, thereby presenting a real game scene.

SUMMARY

In one embodiment of the present disclosure, there is provided a method for processing information, wherein a graphical user interface is obtained by executing a software application on a processor of a terminal and rendering on a touch screen of the terminal, and the graphic user interface at least includes a game scene, the method including:

in case that at least one of a touch sliding event passing a control and a touch sliding event starting from a control is detected, calculating a distance between a current position of a touch point of the touch sliding event and a position of the control in real time; and under the distance is greater than a first preset threshold, adjusting at least one of a direction and a distance of an emission operation for a corresponding skill of the control performed on a virtual character according to the current position of the touch point.

In one embodiment of the present disclosure, there is provided an electronic device, including:

a processor; and a memory for storing executable instructions of the processor;

wherein the processor is configured to perform following steps via executing the executable instructions:

in case that at least one of a touch sliding event passing a control and a touch sliding event starting from a control is detected, calculating a distance between a current position of a touch point of the touch sliding event and a position of the control in real time; and under the distance is greater than a first preset threshold, adjusting at least one of a direction and a distance of an emission operation for a corresponding skill of the control performed on a virtual character according to the current position of the touch point.

In one embodiment of the present disclosure, there is provided a computer-readable storage medium having a computer program stored thereon, wherein the computer program is executed by a processor to implement following steps:

in case that at least one of a touch sliding event passing a control and a touch sliding event starting from a control is detected, calculating a distance between a current position of a touch point of the touch sliding event and a position of the control in real time; and under the distance is greater than a first preset threshold, adjusting at least one of a direction and a distance of an emission operation for a corresponding skill of the control performed on a virtual character according to the current position of the touch point.

DETAILED DESCRIPTION

Exemplary embodiments will now be described more fully with reference to the accompanying drawings.

Figure 1:
FIG. 1 is an operation interface of a mobile phone game A in the related art.
Figure 2:
FIG. 2 is an operation interface of a mobile phone game B in the related art.

At present, in the mobile games such as a MOBA (Multiplayer Online Battle Arena), the following two manners are generally used to achieve the skill emission. In a first manner, a skill emission direction and an attack character are automatically determined by tapping a skill control, referring to a mobile game A shown in FIG. 1. In a second manner, in a mobile game B shown in FIG. 2, the skill is emitted by tapping a skill control and then tapping on an effective range of the game scene, and the distance and the target are determined and an attack is performed according to a position of the finger tapping on the screen.

In the above first manner, there are the following problems: first, the game skill may only be emitted in a single direction and a single distance; second, the user cannot independently select and control the direction and distance of the skill emission, and the user experience may be not good in a multiplayer competitive game. In the above second manner, there are the following problems: first, in case that the screen is relatively small, the finger may easily obstruct the screen when the user taps on the scene to select the target, resulting in an inaccurate selection or an incorrect operation, second, the operation of tapping the skill control and then tapping the emission position is tedious, and a displacement distance of the finger is relatively large when the skill emission is performed, resulting in a low efficiency of the skill emission; third, such method is not conducive to two-handed handheld devices for games, and the user experience may be not good.

Figure 3:
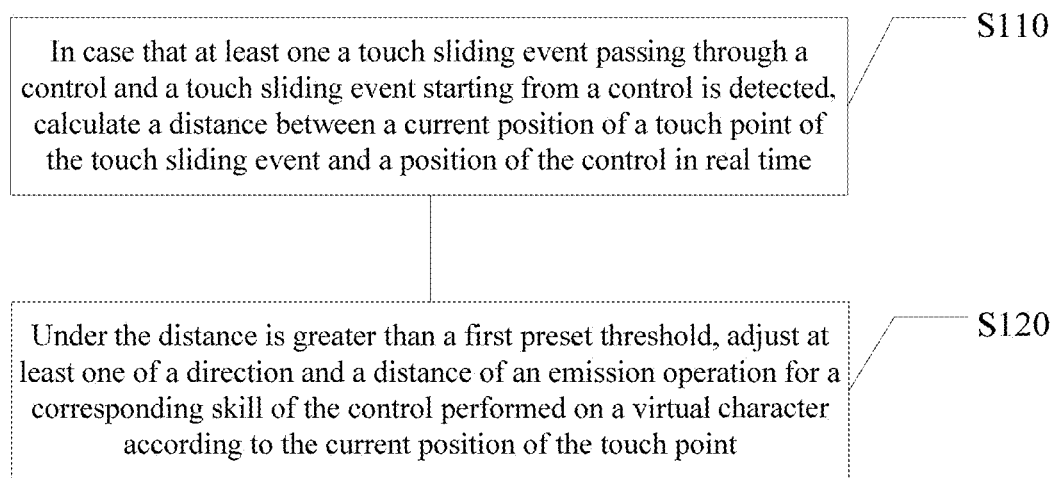
FIG. 3 is a flow chart of a method for processing information according to one of exemplary embodiments of the present disclosure.

The exemplary embodiments of the present disclosure provide a method for processing information. The method for processing information may be applied in a game application and may be presented by executing a software application on a processor of the terminal and rendering the resulting graphical user interface on a touch screen of the terminal. The graphical user interface may be an overall displayable area of the terminal, i.e., a full-screen touch screen; or may be a partially displayable area of the terminal, i.e., a window touch screen. The terminal may be an electronic device such as a desktop computer, or may be a portable electronic device such as a tablet computer, a notebook computer, a game machine, or a smart phone. The game system may be implemented on a terminal by installing a game application or other software application. The terminal includes at least a memory for storing data and a processor for data processing. In this exemplary embodiment, a mobile game of a touch terminal is used as an example for description. With reference to FIG. 3, the method for processing information may include the following steps.

In step S110, when a touch sliding event that passes through a control or starts from a control is detected, a distance between a current position of a touch point of the touch sliding event and a position of the control is calculated in real time.

In step S120, if the distance is greater than a first preset threshold, at least one of a direction and a distance of an emission operation for a corresponding skill of the control performed on a virtual character is adjusted according to the current position of the touch point.

According to the method for processing information in this exemplary embodiment, on the one hand, at least one of the direction and the distance of the skill emission is adjusted according to a change of the current position of the touch point of the touch sliding event, and the skill emission operation can be accurately performed, thereby avoiding an occurrence of a large amount of misoperations, and increasing the accuracy of emission of the skill; on the other hand, the direction of the skill emission operation performed on the virtual character is adjusted according to an orientation of the current position of the touch point, which improves a degree of customization of the skill emission and diversity; on the other hand, reducing a range of finger operation when performing the skill emission operation simplifies the operation steps and improves the operation efficiency.

In the following, the method for processing information in this exemplary embodiment will be further described with reference to FIG. 3.

In the step S110, when a touch sliding event that passes through a control or uses a control as a starting point is detected, a distance between the current position of the touch point of the touch sliding event and the position of the control is calculated in real time.

In this exemplary embodiment, before determining whether a touch sliding event is received, it may first detect whether a touch start operation or a trigger operation is received. The touch start operation may be an operation in which the finger touches the touch interface, that is, the touch interface may be touched by the finger, or the touch interface may be touched by different gestures such as tapping, double-tapping, panning, pressing, dragging, and the like. When it is detected that a finger touches the touch screen to start a touch operation, the system may acquire a position where the touch start operation occurs according to the touch start operation of the finger touching the touch interface. The control may be a skill control, and an area including the skill control may be a skill area. After the touch start operation is received, it may be determined whether the touch start operation is within the skill area by comparing a coordinate of the position of the touch start operation with a coordinate of a range boundary of the skill area. The skill area may include a plurality of different skill controls, the skill area may be set at a bottom right corner or at any position of the graphical user interface, and the skill area may be an area having an arbitrary shape, which are not specifically limited by the present exemplary embodiment. After it is determined that the position where the touch start operation occurs is within the skill area, it may be detected whether there is a touch sliding event continuous with the touch start operation on the touch interface. The position of the touch start operation may be on the skill control, or may be at any position in the skill area, or may be at any position in any area.

The touch sliding event may be continuous with the touch start operation, or they may be separated by a preset interval. The touch sliding event acting on the control may use any skill control within the skill area as a start point, or may use any position on the graphical user interface as the start point, and a track of the touch sliding event needs to pass through any skill control within the skill area. The touch sliding event may be an operation that a finger slides an arbitrary distance in an arbitrary direction on the touch interface, which is not particularly limited in this exemplary embodiment. For example, the touch sliding event may be within the skill area, or may slide from the skill area to any position on the touch interface.

After the touch sliding event acting on the control is detected, the position of the corresponding control and the current position of the touch point of the touch sliding event may be acquired through a coordinate system or other manners, and a distance between the current position of the touch point of the touch sliding event and the position of the control is calculated in real time according to a distance calculation formula, where the distance may be calculated by a function or other means.

In addition, in the example embodiment, the touch sliding event is an event in response to a touch sliding on the control, or an event in response to a tap touch sliding on the control, or an event in response to a re-press touch sliding on the control.

In this exemplary embodiment, the touch sliding event acting on the skill control may be an ordinary slide operation, or may be a tap touch sliding event composed of a tap operation and a slide operation, or may be a re-press touch sliding event composed of a press operation and a slide operation. In addition, the touch sliding event may be a lightly pressed touch sliding event or other types of touch sliding event, which is not particularly limited in this exemplary embodiment. In this exemplary embodiment, the ordinary touch sliding event is taken as an example for description.

In the step S120, when the distance is greater than the first preset threshold, at least one of the direction and the distance of the emission operation for the corresponding skill of the control performed on the virtual character is adjusted according to the current position of the touch point.

In this exemplary embodiment, it may be first determined whether the distance between the current position of the touch point of the touch sliding event and the position of the control is greater than a first preset threshold. The first preset threshold may be used as a minimum distance for skill emission, and may be greater than a radius of the skill control, that is, the touch sliding event may occur in a skill area outside the skill control. When the distance between the current position of the touch point and the position of the control is greater than the first preset threshold, the direction of the skill emission may be adjusted according to the orientation of the current position of the touch point. Specifically, when the current position of the touch point changes, the orientation of the touch point may be re-determined according to the current position of the touch point, and a specific target or a range of skill emission may be determined by the current position of the touch point, in turn, the direction of skill emission may be determined based on an angle between the orientation of the current position of the touch point and a coordinate axis. For example, referring to (a) in FIG. 5, the current position of the touch point is in a direction of 10 o'clock, and referring to (b) in FIG. 5, the current position of the touch point is in a direction of 9 o'clock. Then, in the game scenario, the direction of the skill emission is adjusted from 10 o'clock to 9 o'clock correspondingly.

Figure 6:
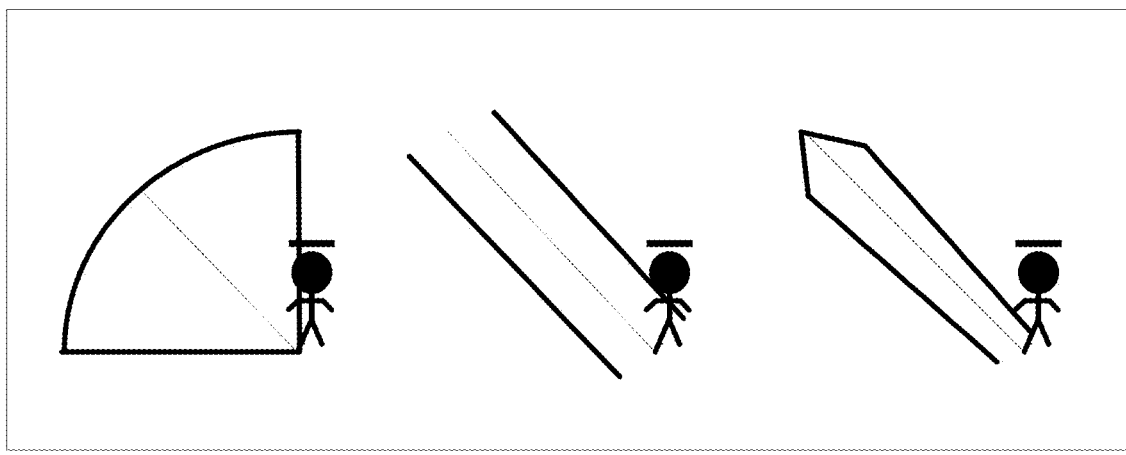
FIG. 6 is a schematic diagram of adjustment of a skill emission direction including a predetermined attack range according to one of the exemplary embodiments of the present disclosure.

In addition, when the distance between the current position of the touch point and the position of the control is greater than the first preset threshold, the distance of the skill emission may also be adjusted according to the distance between the current position of the touch point and the position of the skill control. For example, the skill control in a game may include a direction controlling, a distance controlling, direction and distance controlling, and other types. Referring to FIG. 6, for a skill that includes a preset skill emission range, an attack distance thereof cannot be adjusted, so the direction of performing the skill emission operation may only be adjusted according to the orientation of the touch point. The area where the preset skill is emitted may be an area range with an axisymmetric property, where a center of the touch point is used as an end point, and a connection line between the touch point and the skill emission position is used as an axis of symmetry, and the skill emission area may have a sector shape, a fan shape, a rectangle shape, an arrow shape, a circle shape or any other shape, which is not particularly limited in this exemplary embodiment. For the skills with dual properties of directionality and distance, both the attack distance and the attack direction may be adjusted. In the actual application scenario, the direction of the skill emission may be adjusted according to the orientation of the touch point, and the distance of the skill emission may be adjusted according to the distance between the current position of the touch point and the position of the skill control.

In addition, in this exemplary embodiment, the above method for processing information may further include:

detecting whether there is a touch end event continuous with the touch sliding event;

if the touch end event is detected, determine whether the distance between the current position of the touch point of the touch sliding event and the position of the control is greater than a second preset threshold; and if the distance between the current position of the touch point of the touch sliding event and the position of the control is less than or equal to the second preset threshold, the emission operation for the corresponding skill of the control is performed on the virtual character.

In this exemplary embodiment, after the touch sliding event, whether there is a touch end event continuous with the touch sliding event may be detected. The touch end event may be an operation of the finger leaving the touch interface, or an operation that the finger continues to stay at the end of the touch sliding event for more than a preset time, and may also be other operations, which is not limited in this exemplary embodiment. For example, after the user determines the target or range of skill emission through the touch sliding event, the user may lift the finger to move the finger away from the touch interface, or may keep the finger at the end of the track of the touch sliding event for a time equal to or exceeding the preset time, so as to end the current touch sliding event.

In this exemplary embodiment, when the touch end event that the finger leaves the touch interface is detected, whether the distance between the touch point and the skill control is greater than a second preset threshold is determined, so as to determine whether to perform the skill emission operation. In this exemplary embodiment, the second preset threshold is greater than the first preset threshold, and the second preset threshold may be a critical point of a maximum distance at which the skill is emitted. When the distance between the touch point and the skill control is within a range between the first preset threshold and the second preset threshold, the current position of the touch point of the touch sliding event may be determined as the position of emitting the skill, and then the skill emission operation corresponding to the skill control may be performed at this position. In a mobile game, a certain skill may be continuously emitted multiple times, or after each skill is emitted, a next skill may be emitted after a short preset time.

Figure 5:
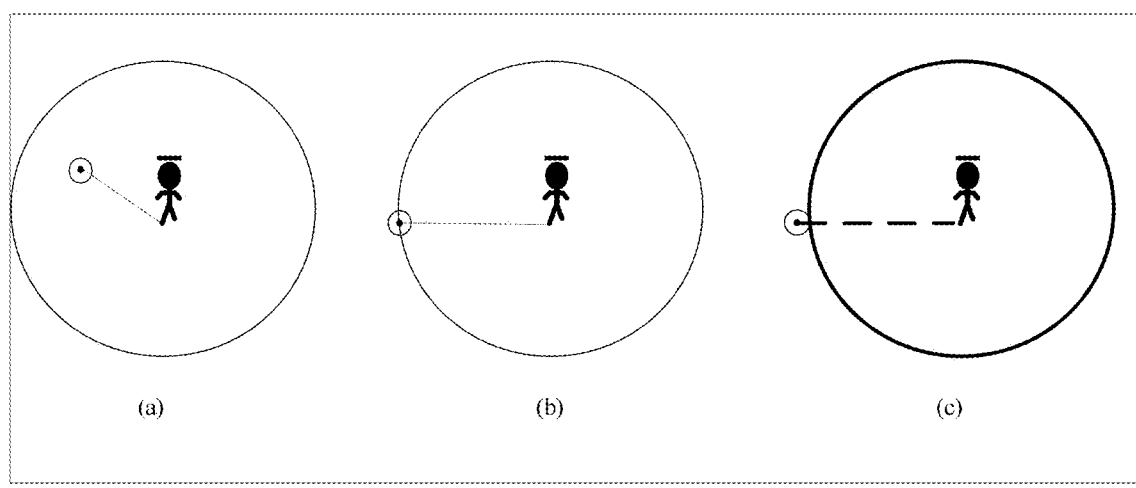
FIG. 5 is a schematic diagram of a skill emission distance according to one of the exemplary embodiments of the present disclosure.

Referring to (a) in FIG. 5, the touch point is located at a minimum starting distance of the skill emission. Since the distance between the touch point and the skill control is within the skill emission range, the skill emission operation may be performed; and referring to (b) in FIG. 5, the touch point is located at a maximum emission distance of the skill emission, and the distance between the touch point and the skill control is equal to the second preset threshold, then the skill emission operation may be performed on the virtual character.

In addition, in this exemplary embodiment, the above method for processing information may further include:

if it is determined that the distance between the current position of the touch point of the touch sliding event and the position of the control is greater than the second preset threshold, canceling performing the emission operation for the corresponding skill of the control on the virtual character.

In this exemplary embodiment, when the distance between the touch point and the skill control exceeds the second preset threshold of the maximum distance of the skill emission, the skill emission operation may be cancelled. As shown in (c) in FIG. 5, the current position of the touch point exceeds the skill emission range, and therefore, the cancellation of the skill emission operation may be triggered. Here, the cancellation of the emission operation may provide the user with an "estopper operation" so as to avoid causing misoperation, and achieve an effective emission of the skill.

In addition, in this exemplary embodiment, the above method for processing information may further include:

detecting whether there is a touch end event continuous with the touch sliding event; and if the touch end event is detected, performing an emission operation for the corresponding skill of the control on the virtual character.

In this exemplary embodiment, when a touch end event that is continuous with the touch sliding event is detected, the skill emission operation may be directly performed on the virtual character without considering the distance between the end point of the touch sliding event and the skill control. Using this method will not miss an opportunity to emit skills, and can improve the efficiency of skill emission.

In addition, in the exemplary embodiment, the first preset threshold is positively correlated to a minimum emission distance of the skill emission operation, and the second preset threshold is positively correlated to a maximum emission distance of the skill emission operation.

In this exemplary embodiment, the first preset threshold may be positively related to the minimum distance of skill emission. That is, the smaller the first preset threshold is, the shorter the minimum distance of skill emission is, and the shorter the required track of the touch sliding event when the skill emission operation is performed within the preset skill emission range is. The second preset threshold may be positively related to the maximum distance of the skill emission. The larger the second preset threshold is, the greater the maximum distance of skill emission is, and the more efficient of emitting the skill within the preset range is.

In addition, in this exemplary embodiment, the above method for processing information may further include:

if the touch sliding event is detected, determining whether the distance between the current position of the touch point of the touch sliding event and the position of the control is greater than a third preset threshold; wherein the third preset is less than or equal to the first preset threshold; and if it is determined that the distance between the current position of the touch point of the touch sliding event and the position of the control is greater than the third preset threshold, displaying an auxiliary object on the graphic user interface.

In this exemplary embodiment, when a touch sliding event is detected in the skill area, it may be determined whether to display the auxiliary object by determining whether the distance between the end point of the touch control and the skill control is greater than the third preset threshold. The third preset threshold may be equal to or less than the first preset threshold, that is, the third preset threshold may be less than or equal to a radius of any skill control. The auxiliary object may be displayed when a touch sliding event with a short skill area is detected, and then a length of the auxiliary object is calculated based on the distance between the current position of the touch point and the position of the control. By displaying the auxiliary object, the user can more intuitively and clearly identify and adjust the direction and distance of the skill emission.

In addition, in this exemplary embodiment, the auxiliary object is an auxiliary line; wherein the auxiliary line uses the control as a starting point and the current position of the touch point as an end point.

Figure 4:
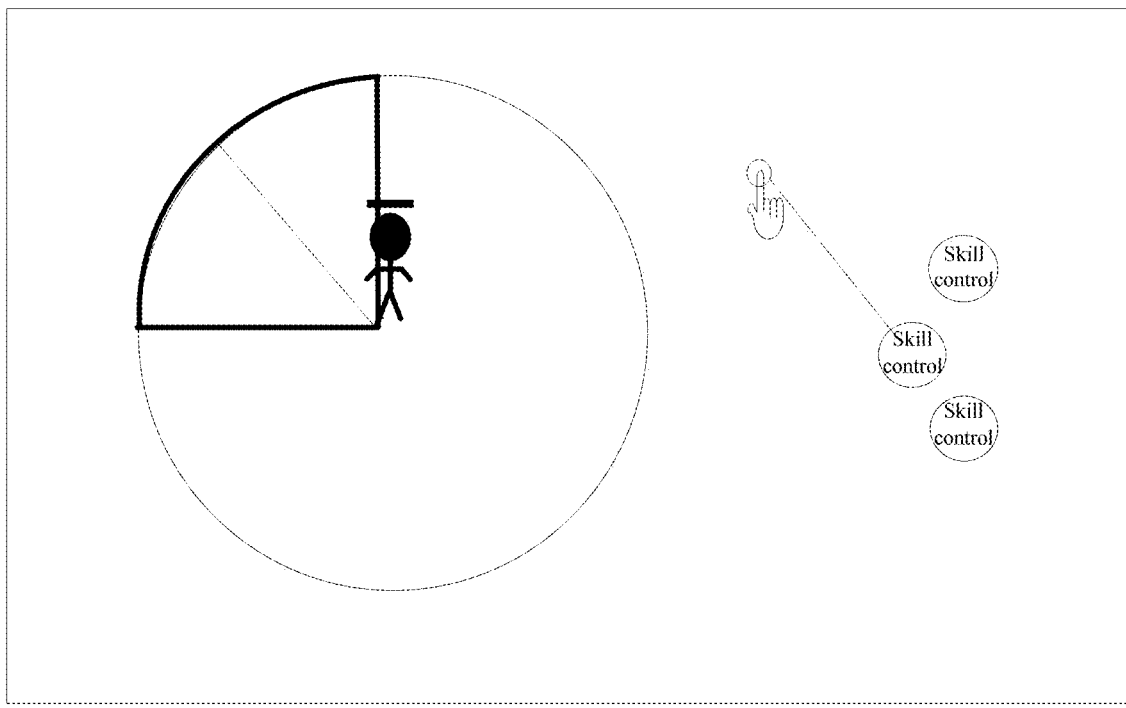
FIG. 4 is a schematic diagram of displaying an auxiliary object according to one of the exemplary embodiments of the present disclosure.

In this exemplary embodiment, the auxiliary object may be an auxiliary line. The starting point of the auxiliary line may be a center point of the skill control, or may be a center point of the finger touching the touch interface. The end point of the auxiliary line may be the current position of the touch point. The auxiliary line may be a solid line, a dotted line, or other forms of line. Referring to FIG. 4, when the distance between the current position of the touch point and the skill control is greater than the third preset threshold, an auxiliary line in the form of a dashed line may be displayed; and when the distance between the current position of the touch point and the skill control is greater than the first preset threshold, the auxiliary line may be changed following the change of the current position of the touch point.

In addition, in this exemplary embodiment, adjusting the direction of the emission operation for the corresponding skill of the control performed on the virtual character according to the current position of the touch point includes:

when the current position of the touch point changes, adjusting the direction of the emission operation for the corresponding skill of the control according to a mapping relationship between an angle of the auxiliary line and the direction of the skill emission operation.

In this exemplary embodiment, the angle of the auxiliary line may be determined according to the orientation where the current position of the touch point is located, and then the direction of the skill emission may be determined according to the angle of the auxiliary line. When the current position of the touch point changes, the direction of the skill emission operation may be adjusted according to a one-to-one correspondence between the angle of the auxiliary line and the direction of the skill emission operation.

In addition, in this exemplary embodiment, adjusting the distance of the emission operation for the corresponding skill of the control performed on the virtual character according to the current position of the touch point includes:

when the current position of the touch point changes, adjusting the distance of the emission operation for the corresponding skill of the control according to a mapping relationship between a length of the auxiliary line and the distance of the skill emission operation.

In this exemplary embodiment, the length of the auxiliary line may be determined according to the current position of the touch point, and then the distance of the skill emission may be determined according to the length of the auxiliary line. When the current position of the touch point changes, the distance of the skill emission operation may be adjusted according to a one-to-one correspondence between the length of the auxiliary line and the distance of the skill emission operation.

In addition, in this exemplary embodiment, when it is determined that the distance between the current position of the touch point of the touch sliding event and the position of the control is greater than the second preset threshold, the auxiliary line is distinctively displayed to prompt to cancel the emission operation for the corresponding skill of the control performed on the virtual character.

In this exemplary embodiment, when the distance between the current position of the touch point and the skill control is greater than the second preset threshold, the auxiliary line may be distinctively displayed to prompt to cancel the skill emission operation. For example, the auxiliary line may be displayed in a bold outline, or the auxiliary line may be displayed in a highlighted form, or the auxiliary line may be displayed in a blinking manner or in any other form, which is not particularly limited in the exemplary embodiment. A loop algorithm or other algorithm may be used to determine whether the distance between the current position of the touch point and the skill control is greater than the second preset threshold, so as to determine whether it is necessary to display the auxiliary line distinctively and cancel the skill emission operation.

Referring to (c) in FIG. 5, when the distance between the current position of the touch point and the skill control is greater than the second preset threshold, the auxiliary line may be displayed in a bold outline, and a maximum range of the skill emission may also be displayed in a bold outline to prompt the cancellation of the skill emission operation on the virtual character. Through the distinctive display of the auxiliary line, the user can more accurately perform the cancellation of the skill emission operation, avoid a large number of misoperations, and provide the user with an "estopper operation" for the skill emission.

Figure 7:
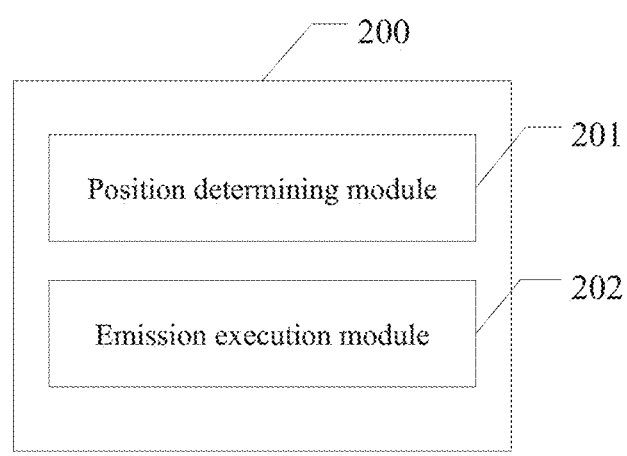
FIG. 7 is a structural diagram of an apparatus for processing information according to one of the exemplary embodiments of the present disclosure.

In an exemplary embodiment of the present disclosure, an apparatus for processing information is further provided. Referring to FIG. 7, the apparatus for processing information 200 may include: a position determining module 201 and an emission execution module 202.

The position determining module 201 may be configured to, when a touch sliding event passing a control or starting from a control is detected, calculate a distance between a current position of a touch point of the touch sliding event and a position of the control in real time.

The emission execution module 202 may be configured to, if the distance is greater than a first preset threshold, adjust at least one of a direction and a distance of an emission operation for a corresponding skill of the control performed on a virtual character according to the current position of the touch point.

The specific details of each module in the above apparatus for processing information have been described in detail in the corresponding method for processing information, and therefore will not be repeated here.

In an exemplary embodiment of the present disclosure, an electronic device capable of implementing the above method is also provided.

Those skilled in the art may understand that various aspects of the present disclosure may be implemented as a system, a method, or a program product. Therefore, various aspects of the present disclosure may be embodied in the form of a complete hardware implementation, a complete software implementation (including a firmware, a microcode, etc.), or an implementation combining hardware and software, which may be collectively referred to "circuit", "module" or "system" here.

The electronic device 600 according to this embodiment of the present disclosure is described below with reference to FIG. 8. The electronic device 600 shown in FIG. 8 is merely an example, and should not impose any limitation on the function and scope of use of the embodiments of the present disclosure.

Figure 8:
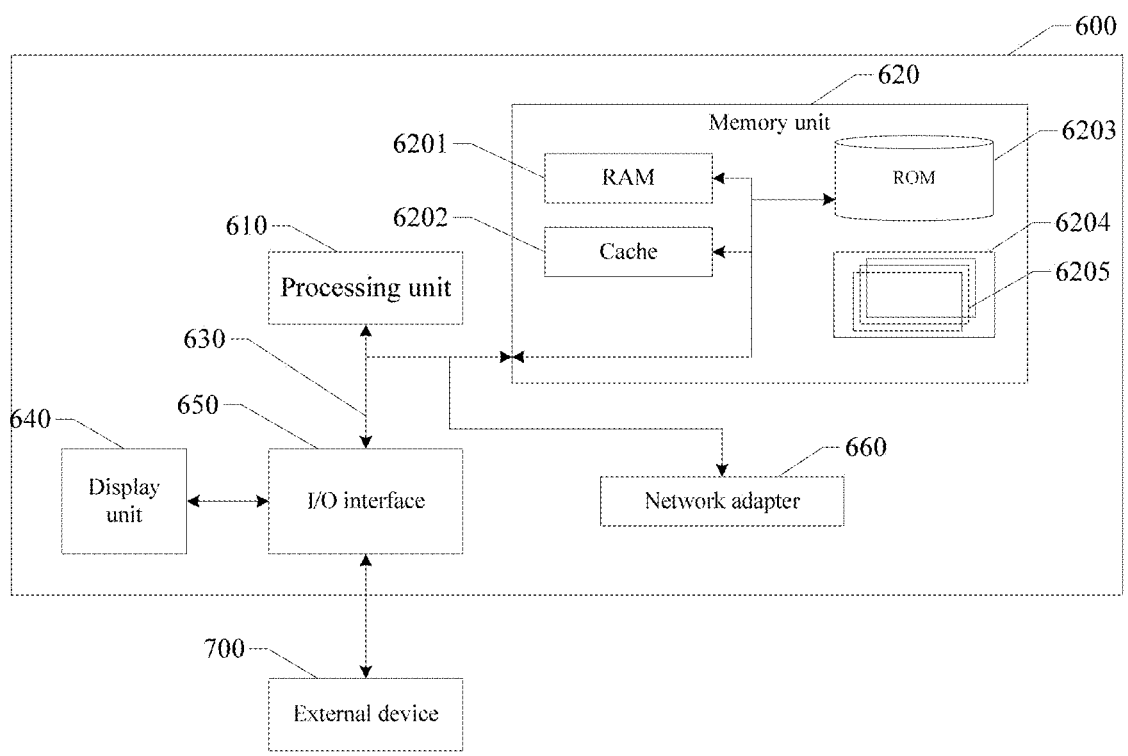
FIG. 8 is a block diagram of an electronic device according to one of the exemplary embodiments of the present disclosure.

As shown in FIG. 8, the electronic device 60X) is represented in the form of a general-purpose computing device. Components of the electronic device 600 may include, but is not limited to, at least one processing unit 610 described above, at least one storage unit 620 described above, a bus 630 connecting different system components (including the storage unit 620 and the processing unit 610), and a display unit 640.

The storage unit stores a program code, and the program code may be executed by the processing unit 610 so that the processing unit 610 executes the steps in various exemplary embodiments according to the present disclosure described in the above-mentioned "exemplary method" section of this specification.

The memory unit 620 may include a readable medium in the form of a volatile memory unit, such as at least one of a random access memory unit (RAM) 6201 and a cache memory unit 6202, and may further include a read only memory unit (ROM) 6203.

The storage unit 620 may also include a program/utility 6204 having a set (at least one) of program modules 6205, such program modules 6205 including but not limited to: an operating system, one or more application programs, other program modules, and program data. Each or some combination of these examples may include the implementation of a network environment.

The bus 630 may represent one or more of several types of bus structures, including a memory cell bus or a memory cell controller, a peripheral bus, an accelerated graphics port, a processing unit, or a local bus using any of a variety of bus structures.

The electronic device 600 may also communicate with one or more external devices 700 (e.g., a keyboard, a pointing device, a Bluetooth device, etc.), and may also communicate with one or more devices that enable the user to interact with the electronic device 600, or may communicate with any device (e.g., a router, a modem, etc.) that enables the electronic device 600 to communicate with one or more other computing devices. This communication may be performed via an input/output (I/O) interface 650. Also, the electronic device 600 may also communicate with one or more networks (e.g., at least one of a local area network (LAN), a wide area network (WAN), and a public network, such as the Internet) through a network adapter 660. As shown in the drawings, the network adapter 660 communicates with other modules of the electronic device 600 via the bus 630. It should be understood that although not shown in the drawings, at least one of other hardware and software modules may be used in conjunction with the electronic device 600, including but not limited to: a microcode, a device driver, a redundant processing unit, an external disk drive array, a RAID systems, a tape drive, and a data backup storage system.

Through the foregoing description of the embodiments, those skilled in the art can easily understand that the exemplary embodiments described herein may be implemented by software, and may also be implemented by software in combination with necessary hardware. Therefore, the technical solution according to the embodiments of the present disclosure may be embodied in the form of a software product that may be stored in a non-volatile storage medium (which may be a CD-ROM, a U disk, a mobile hard disk, etc.) or on a network, including several instructions to make a computing device (which may be a personal computer, a server, a terminal device, or a network device, etc.) perform the method according to the embodiments of the present disclosure.

In an exemplary embodiment of the present disclosure, there is also provided a computer readable storage medium on which a program product capable of implementing the method described above in this specification is stored. In some possible implementations, various aspects of the present disclosure may also be implemented in the form of a program product including a program code. The program code, when being executed on the terminal device, makes the terminal device perform the steps according to various exemplary embodiments of the present disclosure described in the above-described "exemplary method" section of this specification.

Figure 9:
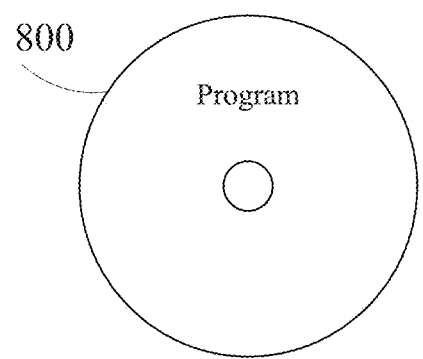
FIG. 9 illustrates a program product for processing information according to one of the exemplary embodiments of the present disclosure.

Referring to FIG. 9, a program product 800 for implementing the above method according to the embodiment of the present disclosure is described. The program product 800 may use a portable compact disc read-only memory (CD-ROM) and include program codes, and may be run in a terminal device, such as a personal computer. However, the program product of the present disclosure is not limited thereto, and in this disclosure, the readable storage medium may be any tangible medium that contains or stores a program that may be used by or in conjunction with an instruction execution system, apparatus, or device.

The program product may employ any combination of one or more readable media. The readable medium may be a readable signal medium or a readable storage medium. The readable storage medium may be, for example but not limited to, a system, an apparatus, or a device of electronic, magnetic, optical, electromagnetic, infrared, or semiconductor, or any combination of the above. More specific examples (non-exhaustive listing) of the readable storage media include: electrical connections with one or more wires, portable disks, hard disks, random access memory (RAM), read only memory (ROM), erasable programmable read-only memory (EPROM or flash memory), an optical fiber, a portable compact disc read-only memory (CD-ROM), an optical storage device, a magnetic storage device, or any suitable combination of the above.

The computer readable signal medium may include a data signal that propagates in a baseband or as a part of a carrier wave, and carry readable program codes. Such propagated data signals may take a variety of forms, including but not limited to electromagnetic signals, optical signals, or any suitable combination of the above. The readable signal medium may also be any readable medium other than the readable storage medium, and the readable medium may transmit, propagate, or transport a program for use by or in connection with an instruction execution system, apparatus, or device.

The program code contained in the readable medium may be transmitted using any suitable medium, including but not limited to wireless, wired, optical cable, RF, etc., or any suitable combination of the above.

The program code for performing the operations of the present disclosure may be written in any combination of one or more programming languages, including object-oriented programming languages such as Java. C++, etc., as well as conventional procedural programming languages such as the "C" language or similar programming languages. The program code may execute entirely on the user's computing device, partly execute on the user's device, execute as a stand-alone software package, execute partly on the user's computing device and partly on a remote computing device, or execute entirely on the remote computing device or a server. In situations involving the remote computing device, the remote computing device may be connected to the user's computing device through any type of network, including a local area network (LAN) or a wide area network (WAN), or may be connected to an external computing device (e.g., connected via the Internet using an Internet service offering).

In addition, the above-mentioned drawings are merely schematic illustrations of processes included in the method according to the exemplary embodiments of the present disclosure, and are not for limiting purposes. It will be readily understood that the processes illustrated in the above drawings do not indicate or limit a chronological order of these processes. In addition, it is also easily understood that these processes may be performed synchronously or asynchronously, for example, in a plurality of modules.

However, exemplary embodiments may be implemented in various forms and should not be construed as limited to the embodiments set forth herein; rather, these embodiments are provided so that this disclosure will be thorough and complete, and will fully convey the concept of the example embodiments to those skilled in the art. The same reference numerals in the drawings denote the same or similar parts, and thus repeated descriptions thereof will be omitted.

Furthermore, the described features, structures, or characteristics may be combined in any suitable manner in one or more embodiments. In the following description, numerous specific details are provided to provide a thorough understanding of the embodiments of the present disclosure. However, those skilled in the art will recognize that the technical solutions of the present disclosure may be practiced without one or more of the specific details, or that other methods, components, materials, devices, steps, etc. may be employed. In other instances, well-known structures, methods, devices, implementations, materials, or operations are not shown or described in detail to avoid obscuring aspects of the present disclosure.

The block diagram shown in the drawings is merely a functional entity and does not necessarily have to correspond to a physically separate entity. That is, these functional entities may be implemented in the form of software, or these functional entities or a part of these functional entities may be implemented in one or more software hardened modules, or these functional entities may be implemented in at least one of different network, processor devices and microcontroller devices.

It should be noted that although several modules or units of the apparatus for action execution are mentioned in the above detailed description, such division is not mandatory. In fact, according to the embodiments of the present disclosure, the features and functions of two or more modules or units described above may be embodied in one module or unit. Conversely, the features and functions of one module or unit described above may be further divided into multiple modules or units.

Those skilled in the art will readily recognize other embodiments of the present disclosure upon consideration of the specification and practice of the contents disclosed herein. This application is intended to cover any variations, uses, or adaptations of the present disclosure which follow the general principles of the present disclosure and include any common knowledge or conventional techniques in this technical field not disclosed by the present disclosure. The description and embodiments are to be considered exemplary only, with the true scope and spirit of the disclosure being indicated by the accompanying claims.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A method for processing information, wherein a graphical user interface is obtained by executing a software application on a processor of a terminal and rendering on a touch screen of the terminal, and the graphical user interface at least includes a game scene, the method comprising:
   in case that at least one of a touch sliding event passing a control and a touch sliding event starting from a control is detected, calculating a distance between a current position of a touch point of the touch sliding event and a position of the control in real time; and
   in response to that the distance is greater than a first preset threshold, adjusting at least one of a direction and a distance of an emission operation for a corresponding skill of the control performed on a virtual character according to the current position of the touch point,
   wherein the method further comprises:
   detecting a touch end event continuous with the touch sliding event;
   in response to that the touch end event is detected, determining whether the distance between the current position of the touch point of the touch sliding event and the position of the control is greater than a second preset threshold; and in response to that the distance between the current position of the touch point of the touch sliding event and the position of the control is less than or equal to the second preset threshold, performing the emission operation for the corresponding skill of the control on the virtual character.

2. The method for processing information according to claim 1, wherein the touch sliding event comprises at least one of an event in response to a touch sliding on the control, an event in response to a tap touch sliding on the control, and an event in response to a re-press touch sliding on the control.

3. The method for processing information according to claim 1, further comprising:

in response to that the distance between the current position of the touch point of the touch sliding event and the position of the control is greater than the second preset threshold, canceling performing the emission operation for the corresponding skill of the control on the virtual character.

4. The method for processing information according to claim 1, further comprising:

detecting a touch end event continuous with the touch sliding event; and in response to that the touch end event is detected, performing the emission operation for the corresponding skill of the control on the virtual character.

5. The method for processing information according to claim 3, wherein the first preset threshold is positively correlated with a minimum emission distance of the emission operation, and the second preset threshold is positively correlated with a maximum emission distance of the emission operation.

6. The method for processing information according to claim 1, further comprising:

in response to that the touch sliding event is detected, determine whether the distance between the current position of the touch point of the touch sliding event and the position of the control is greater than a third preset threshold; wherein the third preset threshold is less than or equal to the first preset threshold; and in response to that the distance between the current position of the touch point of the touch sliding event and the position of the control is greater than the third preset threshold, displaying an auxiliary object on the graphic user interface.

7. The method for processing information according to claim 6, wherein the auxiliary object is an auxiliary line; and wherein the auxiliary line uses the control as a starting point and the current position of the touch point as an end point.

8. The method for processing information according to claim 7, wherein adjusting the direction of the emission operation for the corresponding skill of the control performed on the virtual character according to the current position of the touch point, comprises:

in case that the current position of the touch point changes, adjusting the direction of the emission operation for the corresponding skill of the control according to a mapping relationship between an angle of the auxiliary line and the direction of the emission operation.

9. The method for processing information according to claim 7, wherein adjusting the distance of the emission operation for the corresponding skill of the control performed on the virtual character according to the current position of the touch point, comprises:

in the case that the current position of the touch point changes, adjusting the distance of the emission operation of the corresponding skill of the control according to a mapping relationship between a length of the auxiliary line and the distance of the emission operation.

10. The method for processing information according to claim 7, wherein in response to that the distance between the current position of the touch point of the touch sliding event and the position of the control is greater than the second preset threshold, displaying distinctively the auxiliary line to prompt to cancel the emission operation for the corresponding skill of the control performed on the virtual character.

11. An electronic device, comprising:

a processor; and a memory for storing executable instructions of the processor;

wherein the processor is configured to perform following steps via executing the executable instructions:

in case that at least one of a touch sliding event passing a control and a touch sliding event starting from a control is detected, calculating a distance between a current position of a touch point of the touch sliding event and a position of the control in real time; and in response to that the distance is greater than a first preset threshold, adjusting at least one of a direction and a distance of an emission operation for a corresponding skill of the control performed on a virtual character according to the current position of the touch point, wherein the processor is configured to perform following steps via executing the executable instructions:

detecting a touch end event continuous with the touch sliding event;

in response to that the touch end event is detected, determining whether the distance between the current position of the touch point of the touch sliding event and the position of the control is greater than a second preset threshold; and in response to that the distance between the current position of the touch point of the touch sliding event and the position of the control is less than or equal to the second preset threshold, performing the emission operation for the corresponding skill of the control on the virtual character.

12. The electronic device according to claim 11, wherein the touch sliding event comprises at least one of an event in response to a touch sliding on the control, an event in response to a tap touch sliding on the control, and an event in response to a re-press touch sliding on the control.

13. The electronic device according to claim 11, wherein the processor is configured to perform following steps via executing the executable instructions:

in response to that the distance between the current position of the touch point of the touch sliding event and the position of the control is greater than the second preset threshold, canceling performing the emission operation for the corresponding skill of the control on the virtual character.

14. The electronic device according to claim 11, wherein the processor is configured to perform following steps via executing the executable instructions:

detecting a touch end event continuous with the touch sliding event; and in response to that the touch end event is detected, performing the emission operation for the corresponding skill of the control on the virtual character.

15. The electronic device according to claim 11, wherein the first preset threshold is positively correlated with a minimum emission distance of the emission operation, and the second preset threshold is positively correlated with a maximum emission distance of the emission operation.

16. The electronic device according to claim 11, wherein the processor is configured to perform following steps via executing the executable instructions:
   in response to that the touch sliding event is detected, determine whether the distance between the current position of the touch point of the touch sliding event and the position of the control is greater than a third preset threshold; wherein the third preset threshold is less than or equal to the first preset threshold; and
   in response to that the distance between the current position of the touch point of the touch sliding event and the position of the control is greater than the third preset threshold, displaying an auxiliary object on the graphic user interface.

17. The electronic device according to claim 16, wherein the auxiliary object is an auxiliary line; and wherein the auxiliary line uses the control as a starting point and the current position of the touch point as an end point.

18. A computer-readable storage medium having a computer program stored thereon, wherein the computer program is executed by a processor to implement following steps:

in case that at least one of a touch sliding event passing a control and a touch sliding event starting from a control is detected, calculating a distance between a current position of a touch point of the touch sliding event and a position of the control in real time; and in response to that the distance is greater than a first preset threshold, adjusting at least one of a direction and a distance of an emission operation for a corresponding skill of the control performed on a virtual character according to the current position of the touch point, wherein the computer program is executed by a processor to further implement following steps:

detecting a touch end event continuous with the touch sliding event;

in response to that the touch end event is detected, determining whether the distance between the current position of the touch point of the touch sliding event and the position of the control is greater than a second preset threshold; and in response to that the distance between the current position of the touch point of the touch sliding event and the position of the control is less than or equal to the second preset threshold, performing the emission operation for the corresponding skill of the control on the virtual character.

* * * * *